(12) United States Patent
Kalman (10) Patent No.: US 10,402,100 B2
(45) Date of Patent: Sep. 3, 2019

(54) TECHNIQUES FOR PATH OPTIMIZATION IN STORAGE NETWORKS

(71) Applicant: NetApp, Inc., Sunnyvale, CA (US)

(72) Inventor: Dean Kalman, Cary, NC (US)

(73) Assignee: NetApp Inc., Sunnyvale, CA (US)

( * ) Notice: Subject to any disclaimer, the term of this patent is extended or adjusted under 35 U.S.C. 154(b) by 448 days.

(21) Appl. No.: 15/078,993

(22) Filed: Mar. 23, 2016

(65) Prior Publication Data

US 2017/0277439 A1   Sep. 28, 2017

(51) Int. Cl.
*G06F 3/06* (2006.01)

(52) U.S. Cl.
CPC .......... *G06F 3/0611* (2013.01); *G06F 3/0635* (2013.01); *G06F 3/0665* (2013.01); *G06F 3/0689* (2013.01)

(58) Field of Classification Search
CPC ..... G06F 3/0611; G06F 3/0635; G06F 3/0665
See application file for complete search history.

(56) References Cited

U.S. PATENT DOCUMENTS

| | | | |
|---|---|---|---|
| 7,668,981 B1 * | 2/2010 | Nagineni | H04L 41/0896 710/15 |
| 2005/0256961 A1 * | 11/2005 | Alon | H04L 29/06 709/229 |
| 2006/0235957 A1 * | 10/2006 | Faucher | H04L 67/2819 709/223 |
| 2007/0271434 A1 * | 11/2007 | Kawamura | G06F 3/0608 711/165 |
| 2008/0147777 A1 * | 6/2008 | Azulai | G06F 9/541 709/202 |
| 2008/0177947 A1 * | 7/2008 | Eguchi | G06F 3/061 711/114 |
| 2009/0193145 A1 * | 7/2009 | Coronado | G06F 3/0605 709/240 |
| 2009/0234957 A1 * | 9/2009 | Li | G06F 17/30595 709/229 |
| 2012/0036330 A1 * | 2/2012 | Saito | G06F 3/0617 711/162 |
| 2013/0080710 A1 * | 3/2013 | McLamb | H04L 43/10 711/147 |
| 2015/0169249 A1 * | 6/2015 | Kalman | G06F 3/0635 710/38 |

* cited by examiner

*Primary Examiner* — Tim T Vo
*Assistant Examiner* — Phong H Dang
(74) *Attorney, Agent, or Firm* — Cooper Legal Group, LLC (57) ABSTRACT

Disclosed are various embodiments for managing paths in a cluster environment. The cluster environment receives a request from a client to access a logical storage volume via a selected one of a plurality of paths defined for the logical storage volume. In response to an access of the logical storage volume via one of the paths, the cluster environment updates a timestamp for the respective path that corresponds to a time of the access via the respective path. Subsequently, the cluster environment determines a remote path defined for the logical storage volume that can be removed based upon comparing a timestamp for the selected path with a timestamp for the remote path.

20 Claims, 5 Drawing Sheets

TECHNIQUES FOR PATH OPTIMIZATION IN STORAGE NETWORKS

TECHNICAL FIELD

The present disclosure relates generally to storage systems and more specifically to optimizing paths in storage networks.

BACKGROUND

In a storage network, such as a storage area network (SAN) cluster, abstraction techniques may be used to present physical storage locations of multiple storage nodes as a common virtual storage array. Such abstraction techniques may involve defining various logical interfaces that correspond to various physical ports of the storage nodes. The logical interfaces are presented to hosts as paths via which logical storage volumes of the virtual storage array may be accessed.

Over time, the SAN cluster environment can accumulate a large number of paths for which state information is maintained by the nodes and the hosts, thereby consuming memory and other computing resources. If particular paths are no longer used or needed by the hosts, the resource consumption due to maintaining these paths is unnecessary. Under such circumstances, the performance of the SAN cluster environment could be improved by removing the unneeded paths and releasing resources that maintaining them consumes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed herein are various embodiments for managing the paths provided by a storage area network (SAN) cluster environment for accessing logical storage volumes. In the SAN cluster environment, a logical storage volume may be accessible via a certain node of the SAN cluster. Hosts (sometimes referred to as "clients") can access the logical storage volume through one or more paths that utilize corresponding logical interfaces (LIFs) defined by the SAN cluster.

Over time, logical storage volumes may be moved among the nodes of the SAN cluster. As a result of the move, one or more new logical unit number (LUN) paths (sometimes referred to simply as "paths") are created to provide an optimized or "local" path to the logical storage volume directly to the node in which the logical volume is now stored. However, any paths from a prior location of the logical storage volume may still exist and be used by hosts, albeit now through an un-optimized or "remote" path. (For simplicity, throughout this disclosure, arrangements where a logical storage volume is stored on physical storage resources managed by a storage node may be referred to as the logical storage volume being stored on the storage node.)

In order to remove the remote paths without making the logical storage volume inaccessible to clients still using these remote paths, the SAN cluster can employ timestamps for the various paths that indicate when a respective path is used by a host. As disclosed herein, by comparing the timestamps of the various paths that exist to access a given logical storage volume, the SAN cluster environment can determine whether particular paths can be removed. Removal of paths may improve the performance of the SAN by reducing resource consumed by maintaining unnecessary paths.

Figure 1:
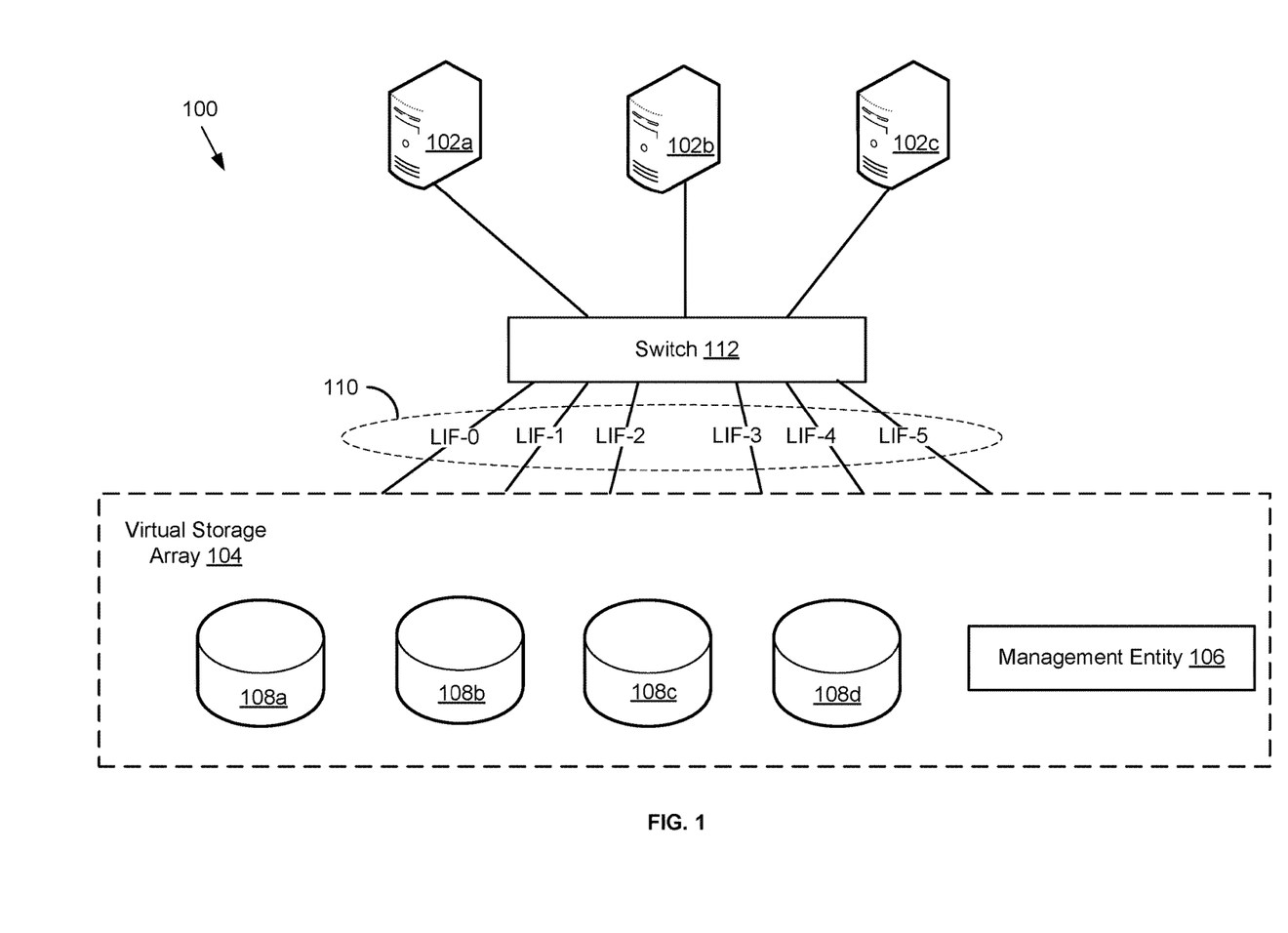
FIG. 1 is a diagram of an operating environment in which paths in a storage network may be optimized according to various embodiments of the present disclosure.

FIG. 1 depicts an example of an operating environment 100 such as may be associated with various embodiments. In the operating environment 100, the clients 102a-c are communicatively coupled to a virtual storage array 104. The virtual storage array 104 may include a network storage system that is controlled or otherwise managed by a management entity 106. The virtual storage array 104 managed by the management entity 106 can provide one or more logical storage volumes 108a-d for use by clients 102a-c. More particularly, the management entity 106 may be executed by one or more processing devices to implement the virtual storage array 104 by applying various layers or types of abstraction to an underlying network of physical storage nodes and associated ports. For example, the management entity 106 may implement virtual storage array 104 by abstracting the physical storage nodes and associated ports of a SAN cluster environment.

The clients 102a-c may access the virtual storage array 104 through various LIFs 110 via a switch 112. In some embodiments, the various LIFs 110 correspond to various ports residing at various network storage nodes. For example, the various LIFs 110 may correspond to various small computer system interface (SCSI) ports of various storage nodes, and thus may correspond to various SCSI paths.

In some embodiments, because of the abstraction provided by management entity 106, the localities of LIFs 110 may be opaque to the clients 102a-c. However, in various embodiments, beneath the abstraction implemented by management entity 106, various factors may render particular LIFs 110 more suitable than others for use as paths to access particular logical storage volumes 108.

Figure 2:
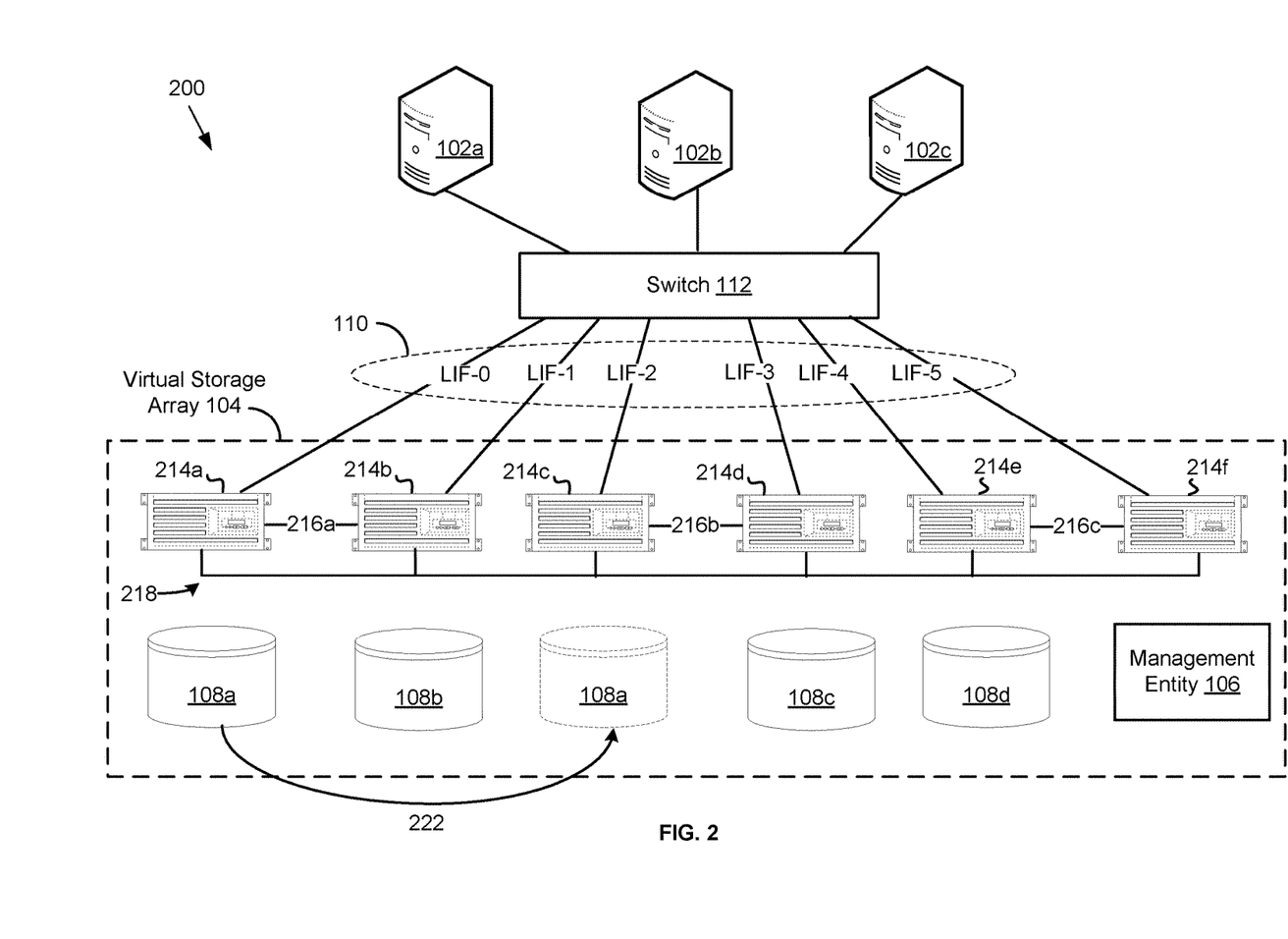
FIG. 2 is another diagram of the operating environment of FIG. 1 in which a mobility event occurs that may trigger path optimization according to various embodiments of the present disclosure.

For example, FIG. 2 depicts an example of an operating environment 200 in which certain LIFs are more suitable than others for access particular logical storage volumes. As shown in FIG. 2, a virtual storage array 104 includes a physical arrangement of storage nodes 214a-f (also referred to simply as "nodes") and various communicative couplings. The management entity 106 can abstract these various communicative couplings to present the virtual storage array 104 to various clients 102a-c. The various storage nodes 214a-f are arranged in high-availability (HA) pairs, each of which includes two storage nodes communicatively coupled by a private heartbeat connection (e.g., the heartbeat connections 216a-c depicted in FIG. 2). The first node of an HA pair may be referred to as a "partner" of the second node in the HA pair. Additionally, the storage nodes 214a-f are interconnected by a cluster interconnect 218.

In the example depicted in FIG. 2, the various LIFs 110 are abstractions of physical ports associated with the various storage nodes 214a-f. For example, LIF0 is an abstraction of a physical port associated with storage node 214a. The various LIFs 110 may be associated with different physical paths, although these paths may not be apparent from the perspective of clients 102a-c due to the abstraction provided by management entity 106. For example, in FIG. 2, the LIF0 may be associated with a port residing on the storage node 214a, and the LIF5 may be associated with a port residing on the storage node 214f.

Likewise, although particular logical storage volumes 108a-d of the virtual storage array 104 may not appear, from the perspective of the clients 102a-c, to have specific physical localities due to the abstraction provided by management entity 106, these particular logical storage volumes may be associated with physical storage locations of particular storage nodes 214a-f. For example, logical storage volume 108a may correspond to physical storage locations of storage node 214a.

In various embodiments, due to the locality characteristics of the LIFs 110, the logical storage volumes 108a-d, or both, particular LIFs 110 may be more or less optimal than others for use in accessing particular logical storage volumes 108a-d. For example, in FIG. 2, the LIF1 may be associated with a local path to logical storage volume 108b because the LIF1 corresponds to a port on storage node 214b, which is the same storage node that contains the physical storage locations to which logical storage volume 108b corresponds. In contrast, the LIF5 may correspond to a port on the storage node 214f, and may thus require the use of cluster interconnect 218 to reach logical storage volume 108b at the storage node 214b. Communicating over cluster interconnect 218 may cause added latency, and as such, LIF5 may include a remote path to the logical storage volume 108b.

These remote paths may result from mobility events in which logical storage volumes corresponding to physical storage at one storage node is reassigned to correspond instead to physical storage at a different storage node. As a result of a mobility event, a path that served as the local path for the logical storage volume prior to the mobility event becomes a remote path to the logical storage volume after the mobility event.

FIG. 2 depicts an example of a mobility event 222. During the mobility event 222, the logical storage volume 108a is reassigned from the storage node 214a to the storage node 214c. In this example, as a result of the mobility event, the management entity 106 may create a local path, via LIF2, to the new location of the logical storage volume 108a, while the previous path (i.e., via LIF0) remains intact to reach the logical storage volume 108a as a remote path.

In some embodiments, the clients 102a-c may perform one or more functions for differentiating between available LIFs 110 based on their suitability for accessing particular logical storage volumes 108a-d. In various embodiments, for example, the clients 102a-c may utilize asymmetrical logical unit access (ALUA) procedure to classify available LIFs 110 as representing or otherwise being associated with optimized or non-optimized paths with respect to particular logical storage volumes 108a-d. According to the ALUA procedure, each available LIF 110 that corresponds to a port at an owner node for a given logical storage volume may be categorized as active and optimized with respect to that logical storage volume, and each available LIF 110 that corresponds to a port at another node may be categorized as active and non-optimized.

For example, one or more of the clients 102a-c may each use an ALUA procedure to identify LIF1 as being associated with an active and optimized path with respect to logical storage volume 108b. The clients 102a-c may also identify any other LIFs with access to the logical storage volume 108b as being associated with a respective active and non-optimized path. In other embodiments, the clients 102a-c may utilize other discovery operations to determine local or remote paths to a given logical storage volume. In still other embodiments, the clients 102a-c may continue to access a given logical storage volume via a configured path (either local or remote) until being re-configured to use a different path.

However, maintaining paths consumes computing resources of the virtual storage array 104 and the clients 102a-c. Thus, if a particular path is no longer being used, the management entity 106 should remove the path to free the computing resources consumed by maintaining the path. For example, if a path has become a remote path for accessing a logical storage volume, and the client has switched to use the local path for the logical storage volume, then the remote path can be removed.

To remove the remote paths without making a logical storage volume inaccessible to the clients 102a-c still using these remote paths, the management entity 106 employs timestamps for the various paths that indicate when a respective path is used by a client. The management entity 106 may use timestamps with some functionality provided by the individual storage nodes 214a-f. By comparing the timestamps of the various paths that exist to access a given logical storage volume, the management entity 106 can determine whether a particular path can be removed. In some embodiments, removing a path can improve the performance of the virtual storage array 104 by reducing computing resources consumed by maintaining unnecessary paths. In other embodiments, timestamps can be reported using a relative time instead of or in addition to an absolute time. For example, rather than a storage node 214 reporting that a path was accessed at an absolute time of 08:00:00 (UTC), it may report that a path was accessed at a relative time of 42 seconds ago.

Various strategies exist for determining when a path for a logical storage volume can be removed. In some embodiments, if a local path for one or more of the logical storage volume 108a-d has a more recent timestamp than one or more other remote paths for the logical storage volume, these remote paths can be removed. In this instance, the remote path can be safely removed because the more recent timestamp for the local path indicates that the client accessing the logical storage volume has already changed from any prior paths to instead utilize the current, local path.

Returning to the prior example of the mobility event 222, prior to the move of the logical storage volume 108a from storage node 214a, a client 102a could access the logical storage volume 108a via a local path using LIF0 at time t. The management entity 106 stores a timestamp oft for this path. However, after the logical storage volume 108a is moved to storage node 214c, the management entity 106 may create a new path via LIF2 as the new local path to access the logical storage volume 108a. The previous path to the logical storage volume 108a via LIF0 becomes a remote path. In some implementations, the management entity 106 creates a new path via LIF2 before the logical storage volume 108a is moved to the storage node 214c, such that a local path will exist for the logical storage volume 108a immediately upon completion of the mobility event 222.

If the client 102a discovers the new local path via LIF2 (e.g., by using ALUA as described above), the client 102a may access the logical storage volume 108a using the new local path at time t+3. The management entity 106 can store a timestamp of t+3 for the local path (via LIF2). The management entity 106 compares the timestamps of the paths for accessing the logical storage volume 108a and determines that the local path has the more recent timestamp. By doing so, the management entity 106 determines that the remote path can be removed at least because the local path having the more recent time timestamp indicates that the client 102a has been reconfigured to use the local path.

Continuing the example, if the client 102a does not discover (or has not yet discovered) the new local path via LIF2, the client 102a may again access the logical storage volume 108a at time t+3 using the now remote path via LIF0. The management entity 106 stores a timestamp of t+3 for this remote path. The management entity 106 compares the timestamps of the paths for accessing the logical storage volume 108a and determines that the remote path has a more recent timestamp than the local path. By doing so, the management entity 106 determines that the remote path should be left intact since the client 102a has not been reconfigured to use the local path. However, if multiple remote paths exist for accessing the logical storage volume 108a, the management entity 106 may remove some or all of the remote paths that have a timestamp prior to the timestamp of t+3 used for the remote path associated with LIF0 (i.e., the remote path has been used more recently).

In other embodiments, the management entity 106 can determine that the timestamps of one or more remote paths for a logical storage volume has never been used and at least one path for this logical storage volume has been used. Based on this determination, the management entity 106 can remove the unused remote paths for this logical storage volume. For example, a timestamp may indicate an unused path through use of a representative date (e.g., the UNIX epoch of Jan. 1, 1970), an omitted value for the timestamp, or other possibilities.

In other embodiments, the management entity 106 can determine that the timestamps of one or more remote paths for a logical storage volume meet an age threshold. Based on this determination, the management entity 106 may remove these particular remote paths for this logical storage volume. For example, an age threshold of six minutes may be used, such that any remote path having a timestamp that is at least six minutes old is removed by the management entity 106. The age threshold configuration may depend upon prior knowledge that the clients 102a-c will discover any changed local path within the age threshold time period, such as through ALUA. As such, use of the age threshold for removing remote paths may depend upon the operating system in use on the clients 102a-c.

In other embodiments, after determining one or more remote paths for a logical storage volume that are eligible for removal, the management entity 106 may retain a number of remote paths that is less than or equal to a configured number. For example, the management entity 106 may be configured to remove at least some of the remote paths for a logical storage volume that are eligible for removal, but retain the most recently used remote path as a backup for the local path. In addition, various combinations of these disclosed embodiments for removing remote paths may also be employed.

For illustrative purposes, the management entity 106 is depicted as being external to the various storage nodes 214a-f of the virtual storage array 104 depicted in FIG. 2. However, other implementations are possible. For example, in some embodiments, one or more of the storage nodes 214a-f may act as the management entity 106, or the management entity 106 may be virtualized by one or more of storage nodes 214a-f.

Figure 3:
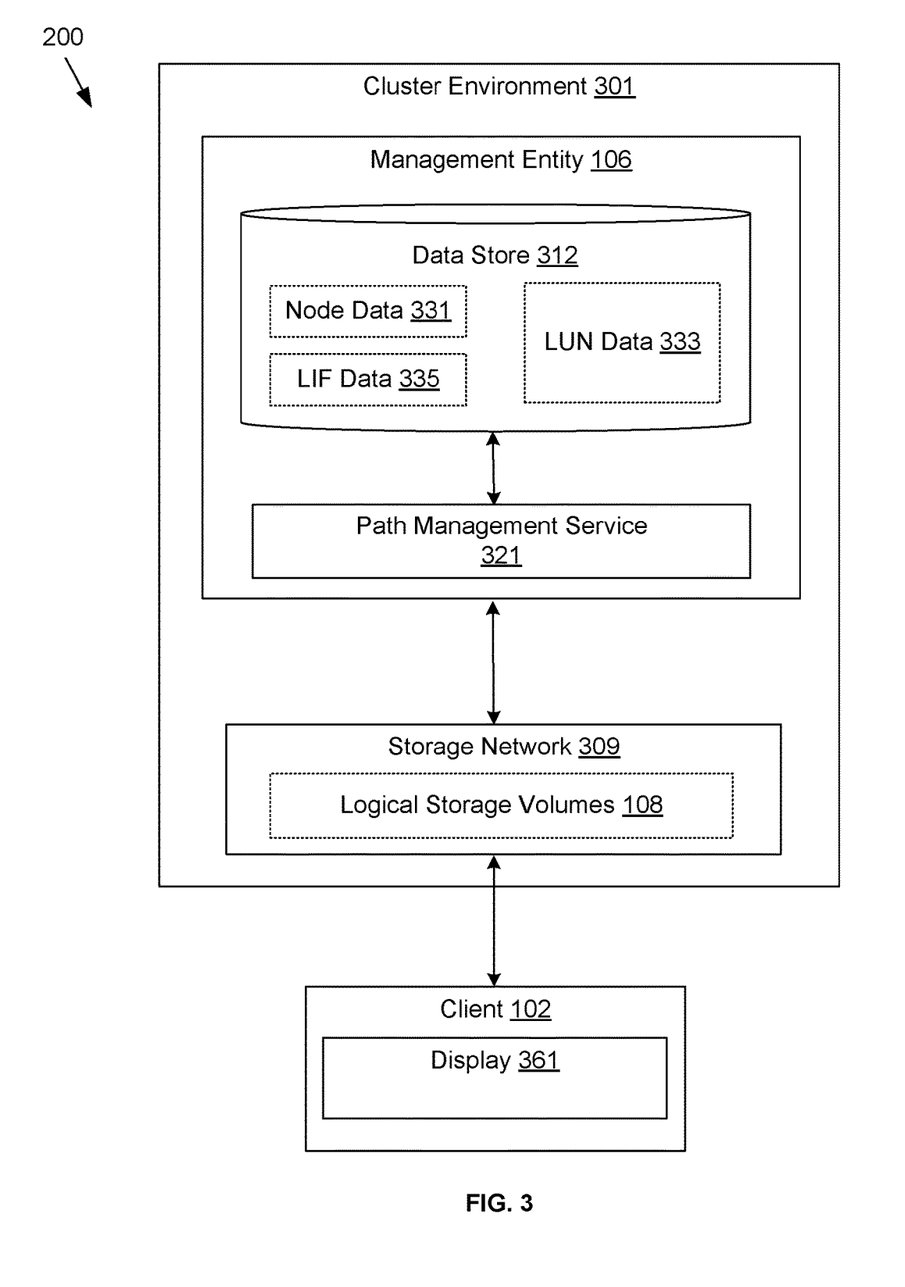
FIG. 3 is a diagram of a cluster environment in which a path management service is used to optimize paths for a storage network according to various embodiments of the present disclosure.

FIG. 3 is a diagram of a cluster environment 301 in which a path management service 321 is used to optimize paths for a storage network 309. The operating environment 200 includes a cluster environment 301 and one or more clients 102. The cluster environment 301 includes a management entity 106, a storage network 309, and possibly other components related to maintaining a virtual storage array not discussed in detail. The storage network 309 may provide the client 102 with access to logical storage volumes 108 (e.g., the volumes 108a-d depicted in FIG. 2) via one or more paths provided by corresponding LIFs.

Various applications or other functionality may be executed in the management entity 106 according to various embodiments. Also, various data is stored in one or more data stores 312 accessible to the management entity 106. The data stored in a data store 312, for example, may be associated with the operation of the various applications or functional entities described herein.

The components executed on the management entity 106, for example, include a path management service 321, and other applications, services, processes, systems, engines, or functionality not discussed in detail herein. The path management service 321 is executed to manage the paths that exist in the cluster environment 301 to access the logical storage volumes stored therein, such as the logical storage volume 108. For example, the path management service 321 may create new paths subsequent to movement of a logical storage volume among different storage nodes. The path management service 321 may also remove existing paths to a logical storage volume that are determined to no longer be needed.

The data stored in the data store 312 includes, for example, node data 331, LUN data 333, LIF data 335, and potentially other data. Example of the node data 331 include: various identifiers for the storage nodes in use within a cluster environment; physical storage resources assigned to the each of the storage nodes; activity logs; version information for one or more of hardware, software, and firmware used on the storage nodes and the corresponding physical storage resources; and other types of data. Examples of the LUN data 333 include: metadata for the logical storage volume 108 and other logical storage volumes of the cluster environment 301; the physical storage resources and storage node on which each logical storage volume is maintained; paths that exist for individual logical storage volumes; times that individual paths were created; timestamps for use of the individual paths; and other types of data. Example of the LIF data 335 include: any LIF definitions and the storage nodes of the cluster environment 301 on which the LIFs are defined; the paths that use individual LIFs; and other types of data.

One or more clients 102 may be communicatively coupled to the storage network 309. A client 102 includes a processor-based system such as a computer system. Such a computer system may be embodied in the form of a server computer, a desktop computer, a laptop computer, a virtual computer executing on another computing device, or other devices with like capability. The client 102 may include or be communicatively coupled to a display 361.

The client 102 may access the logical storage volume 108 through a local path that uses a LIF of a storage node managing the physical resources on which the logical storage volume 108 is stored. As a result of accessing the logical storage volume 108 via the local path, the path management service 321 updates a timestamp for this path (referred to as P1) in the LUN data 333 to record the time t of the access. In addition to the local path, one or more remote paths may exist through which the client 102 can access the logical storage volume 108 via other storage nodes. In some implementations, each of these local and remote paths may also include a corresponding HA partner path.

For various possible reasons, a mobility event may need to occur whereby the logical storage volume 108 is moved to physical storage resources managed by a different storage node within the cluster environment 301. As a part of the mobility event, the management entity 106 may update the LUN data 333 to record the move to the new storage node. The management entity 106 may also update the LUN data 333 to indicate that the LIF that once served as the local path for the logical storage volume 108 has, as a result of the move, become a remote path to the logical storage volume 108. Although the remote path still functions for the client 102 to access the logical storage volume 108, the performance may be diminished.

In order to improve the performance for accessing the logical storage volume 108, the path management service 321 creates a new path on the storage node where the logical storage volume 108 is now stored, thereby creating a new local path to the logical storage volume 108. As a result, the management entity 106 may update LUN data 333 to reflect the addition of the local path. In some embodiments, by using an ALUA procedure or other path discovery feature, the client 102 may discover the path changes and automatically reconfigure to use the new local path instead of the previously configured path that is now a remote path. However, not all possible clients have this capability of automatic local path discovery and may require manual reconfiguration.

Subsequent to the mobility event (e.g., at time t+3), the client 102 may again need to access the logical storage volume 108 following the move to a new storage node. If the client 102 has been configured to use the new local path, the timestamp for this path (referred to as P2) is updated to time t+3 in the LUN data 333. Alternatively, in the event that the client 102 is still using the previously configured path (P1) that is now a remote path, the timestamp for P1 is updated to time t+3 in the LUN data 333.

As a result of the mobility event, a remote path exists for the logical storage volume 108, in addition to any remote paths that existed prior to the mobility event (e.g., paths that may have been used for redundancy). As discussed previously, maintaining paths consumes resources of the cluster environment 301 and the clients 102. Thus, if a particular remote path is no longer needed, the management entity 106 may remove the path to free the computing resources consumed by maintaining the path. To remove the remote paths without making the logical storage volume 108 inaccessible to the client 102, which may still be configured to use the remote paths, the management entity 106 employs timestamps for the various paths that indicate when a respective path is used. By later comparing the timestamps of the various paths that exist to access the logical storage volume 108, the management entity 106 can determine when a particular path for the logical storage volume 108 can be removed. By removing unneeded remote paths, the performance of the cluster environment 301 is improved by reducing computing resources consumed by maintaining unnecessary paths.

To this end, various strategies exist for the path management service 321 to determine when a remote path for the logical storage volume 108 can be removed. In some embodiments, if the current local path (P2) for the logical storage volume 108 has a more recent timestamp than one or more other remote paths (e.g., P1) for the logical storage volume 108, these remote paths can be removed. In this instance, if the client 102 had been configured to use the new local path, then P2 would have the t+3 timestamp that is more recent than the timestamp t for path P1, and the path management service 321 can determine that the remote path P1 should be removed. Moreover, if the path management service 321 determines that the timestamp of P2 is more recent than timestamps for other existing remote paths, the path management service 321 can determine that these remote paths may be removed as well.

Alternatively, the client 102 may not yet be configured to use the new local path. In this case, the remote path P1 would have the t+3 timestamp that is more recent than the yet unused timestamp for local path P2. Thus, the path management service 321 can determine that the remote path P1 should not yet be removed. However, if multiple remote paths to the logical storage volume 108 exists, the path management service 321 may remove some or all of the remote paths that have a timestamp prior to the timestamp of t+3 used for the remote path P1.

In other embodiments, if the timestamps of one or more remote paths for a logical storage volume 108 have never been used and at least one path for this logical storage volume 108 has been used, the management entity 106 may remove the unused remote paths for this logical storage volume 108. For example, a sequence of mobility events may have occurred for the logical storage volume 108 leading the path management service 321 to create a sequence of paths, some of which may become remote prior to the client 102 accessing it. A timestamp may indicate a lack of use through use of a representative date (e.g., the UNIX epoch of Jan. 1, 1970), an omitted value for the timestamp, or other possibilities. In other embodiments, if the timestamps of one or more remote paths for a logical storage volume 108 meet an age threshold, the path management service 321 may remove these particular remote paths for this logical storage volume 108, as described above with respect to FIG. 2. In other embodiments, after determining one or more remote paths for a logical storage volume 108 that are eligible for removal, the path management service 321 may retain up to a configured number of the remote paths, as described above with respect to FIG. 2.

Figure 4:
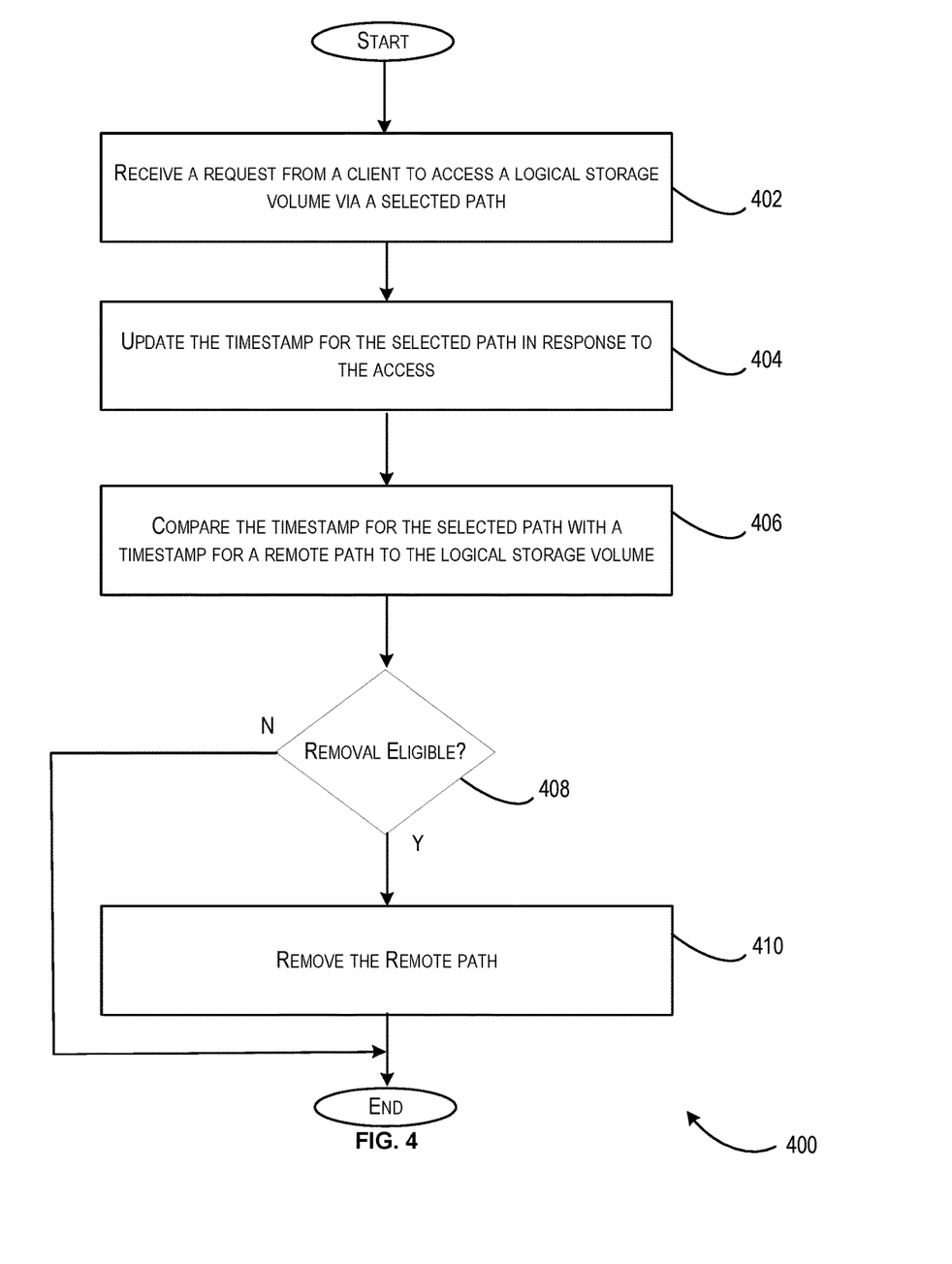
FIG. 4 is a flow chart depicting an example of a process used by the path management service depicted in FIG. 3 to optimize paths in a storage network according to various embodiments of the present disclosure.

FIG. 4 is a flow chart depicting an example of a process 400 used by the path management service 321 optimize paths in a storage network 309. It is understood that the flowchart of FIG. 4 provides merely an example of the many different types of functional arrangements that may be employed to implement the operation of the portion of the path management service 321 as described herein. The operations depicted in the flowchart of FIG. 4 may be initiated upon the path management service 321 being notified of a request from the client to access the logical storage volume.

At block 402, at time t, the path management service 321 may receive notice of a request from a client to access a logical storage volume via a selected path. At block 404, the path management service 321 updates the timestamp for the selected path to time t. As discussed previously, in some embodiments, the storage nodes may record the timestamps for use by the path management service 321. At block 406, the path management service 321 determines whether any remote paths for the logical storage volume are eligible to be removed by comparing the timestamp for the selected path with a timestamp for any previously existing remote path for the logical storage volume.

At block 408, the path management service 321 determines whether the remote path is eligible for removal. If the selected path for the logical storage volume has a more recent timestamp than the remote path for the logical storage volume 108, this remote path is eligible for removal. In some embodiments, the selected path may itself be a remote path, in which case only older or unused remote paths are eligible for removal. In other embodiments, the selected path is a local path, in which case some or all of the remote paths are eligible for removal per the configuration of the path management service 321. In some embodiments, the path management service 321 can remove remote paths without comparing the corresponding timestamps to the timestamp of the selected path. For example, the path management service 321 may remove unused remote paths or remove remote paths that exceed an age threshold.

If, in block 408, the path management service 321 determines that one or more remote paths should be removed, the depicted process proceeds to block 410, which involves the path management service 321 removing one or more remote paths. Alternatively, if the path management service 321 determines, at block 408, that a remote path should not be removed, this portion of the execution of the path management service 321 ends.

Figure 5:
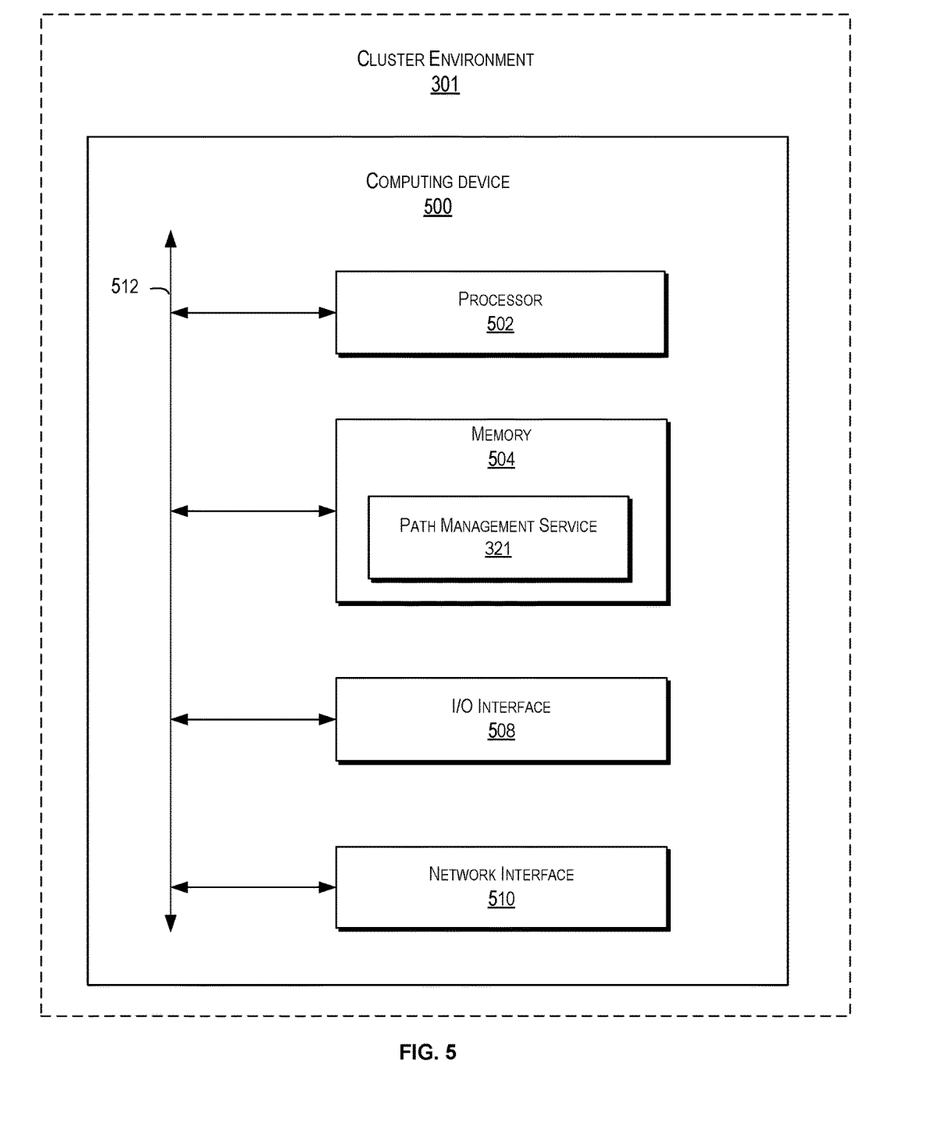
FIG. 5 is a block diagram that provides one example illustration of a cluster environment employed in the networked environment of FIG. 3 according to various embodiments of the present disclosure.

Any suitable devices may be used to implement the cluster environment 301. For example, FIG. 5 is a block diagram depicting an example of the cluster environment 301, which may be referred to as a "computer system." The cluster environment 301 includes one or more computing devices 500, such as may be used to implement a management entity and/or a storage node as described herein. Each computing device 500 includes at least one processor circuit, for example, having a processor 502, a memory 504, an I/O interface 508, and a network interface 510, all of which are coupled to a local interface 512. To this end, each computing device 500 may comprise, for example, at least one server computer or like device. The local interface 512 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are the path management service 321, and potentially other applications. Also stored in the memory 504 may be a data store and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores. The memory 504 may represent multiple memories 504 that operate in parallel processing circuits, respectively. In such a case, the local interface 512 may be an appropriate network that facilitates communication between any two of the multiple processors 502, between any processor 502 and any of the memories 504, or between any two of the memories 504, etc. The local interface 512 may comprise additional systems designed to coordinate this communication, including, for example, performing load balancing. The processor 502 may be of electrical or of some other available construction.

Although the path management service 321 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flow chart of FIG. 4 shows the functionality and operation of an implementation of portions of the path management service 321. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the path management service 321, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the path management service 321, may be implemented and structured in a variety of ways. For example, one or more applications described may be implemented as modules or components of a single application. Further, one or more applications described herein may be executed in shared or separate computing devices or a combination thereof. For example, the applications described herein may execute in the same computing device 500, or in multiple computing devices in the same cluster environment 301. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   maintaining a first path, between a device and a first node storing a logical volume, wherein the first path provides local connectivity between the device and the logical volume stored at the first node;
   migrating the logical volume from the first node to a second node;
   creating a second path between the device and the second node storing the logical volume, wherein the second path provides local connectivity between the device and the logical volume stored at the second node, and wherein the first path provides remote connectivity for the device through the first node to the logical volume stored at the second node;
   evaluating timestamps of the first path and the second path to determine that the device has yet to switch from using the first path to using the second path, wherein a first timestamp of a path is updated with a time of access based upon the logical volume being accessed by the device via the path; and
   retaining the first path and the second path based upon the determination that the device has yet to switch to using the second path, wherein the first path is removed based upon the timestamps indicating that the device has switched from using the first path to using the second path.

2. The method of claim 1, comprising:
   removing the first path based upon determining that the device switched from using the first path to the second path for the local connectivity to the logical volume through the second node based upon the timestamps indicating that the second path has been used more recently than the first path by the device.

3. The method of claim 1, comprising:
   retaining the first path based upon a determination that the timestamps indicate that the first path has been used more recently than the second path.

4. The method of claim 1, comprising:
   retaining the first path based upon determining that the device has not switched from using the first path to the second path based upon the timestamps indicating that the first path has been used more recently than the second path.

5. The method of claim 1, wherein the first path corresponds to a port of the first node.

6. The method of claim 1, wherein the second path corresponds to a port of the second node.

7. The method of claim 1, comprising:
retaining a first subset of a set of paths that provide remote connectivity for devices to the logical volume and removing a second subset of the set of paths based upon the first subset of the set of paths being more recently accessed than the second subset of the set of paths.

8. The method of claim 1, comprising:
retaining a first subset of a set of paths that provide remote connectivity for devices to the logical volume and removing a second subset of the set of paths based upon the first subset of the set of paths having timestamps more recent than an age threshold and the second subset of the set of paths having timestamps older than the age threshold.

9. The method of claim 1, comprising:
removing a set of paths that provide remote connectivity for devices to the logical volume based upon a determination that timestamps of the set of paths indicate that the set of paths have never been used.

10. The method of claim 8, comprising:
configuring the age threshold with a value determined based upon a time that the device will discover the second path.

11. A non-transitory machine readable medium comprising instructions for performing a method, which when executed by a machine, causes the machine to:
maintain a first path between a device and a first node storing a logical volume, wherein the first path provides local connectivity between the device and the logical volume stored at the first node;
migrate the logical volume from the first node to a second node;
create a second path between the device and the second node storing the logical volume, wherein the second path provides local connectivity between the device and the logical volume stored at the second node, and wherein the first path provides remote connectivity for the device through the first node to the logical volume stored at the second node;
evaluate timestamps of the first path and the second path to determine that the device has yet to switch from using the first path to using the second path, wherein a first timestamp of a path is updated with a time of access based upon the logical volume being accessed by the device via the path; and
retain the first path and the second path based upon the determination that the device has yet to switch to using the second path, wherein the first path is removed based upon the timestamps indicating that the device has switched from using the first path to using the second path.

12. The non-transitory machine readable medium of claim 11, wherein the instructions cause the machine to:
remove the first path based upon determining that the device switched from using the first path to the second path for the local connectivity to the logical volume through the second node based upon the timestamps indicating that the second path has been used more recently than the first path by the device.

13. The non-transitory machine readable medium of claim 11, wherein the instructions cause the machine to:
retain the first path based upon a determination that the timestamps indicate that the first path has been used more recently than the second path.

14. The non-transitory machine readable medium of claim 11, wherein the instructions cause the machine to:
retain the first path based upon determining that the device has not switched from using the first path to the second path based upon the timestamps indicating that the first path has been used more recently than the second path.

15. The non-transitory machine readable medium of claim 11, wherein the instructions cause the machine to:
retain a first subset of a set of paths that provide remote connectivity for devices to the logical volume and remove a second subset of the set of paths based upon the first subset of the set of paths being more recently accessed than the second subset of the set of paths, wherein a number of paths selected as the first subset is less than a configured number.

16. A computing device comprising:
a memory comprising machine executable code; and
a processor coupled to the memory, the processor configured to execute the machine executable code to cause the processor to:
maintain a first path between a device and a first node storing a logical volume, wherein the first path provides local connectivity between the device and the logical volume stored at the first node;
migrate the logical volume from the first node to a second node;
create a second path between the device and the second node storing the logical volume, wherein the second path provides local connectivity between the device and the logical volume stored at the second node, and wherein the first path provides remote connectivity for the device through the first node to the logical volume stored at the second node;
evaluate timestamps of the first path and the second path to determine that the device has yet to switch from using the first path to using the second path, wherein a first timestamp of a path is updated with a time of access based upon the logical volume being accessed by the device via the path; and
retain the first path and the second path based upon the determination that the device has yet to switch to using the second path, wherein the first path is removed based upon the timestamps indicating that the device has switched from using the first path to using the second path.

17. The computing device of claim 16, wherein the machine executable code causes the processor to:
retain a first subset of a set of paths that provide remote connectivity for devices to the logical volume and removing a second subset of the set of paths based upon the first subset of the set of paths being more recently accessed than the second subset of the set of paths, wherein a number of paths selected as the first subset is less than a configured number.

18. The computing device of claim 16, wherein the machine executable code causes the processor to:
retain the first path based upon a determination that the timestamps indicate that the first path has been used more recently than the second path.

19. The computing device of claim 16, wherein the machine executable code causes the processor to:

remove the first path based upon determining that the device switched from using the first path to the second path for the local connectivity to the logical volume through the second node based upon the timestamps indicating that the second path has been used more recently than the first path by the device.

20. The computing device of claim 16, wherein the machine executable code causes the processor to:
retain a first subset of a set of paths that provide remote connectivity for devices to the logical volume and removing a second subset of the set of paths based upon the first subset of the set of paths having timestamps more recent than an age threshold and the second subset of the set of paths having timestamps older than the age threshold.

* * * * *